(No Model.) 2 Sheets—Sheet 1.
A. E. SHORTHILL.
CATTLE GUARD FOR RAILWAY TRACKS.
No. 471,029. Patented Mar. 15, 1892.
Fig. I.
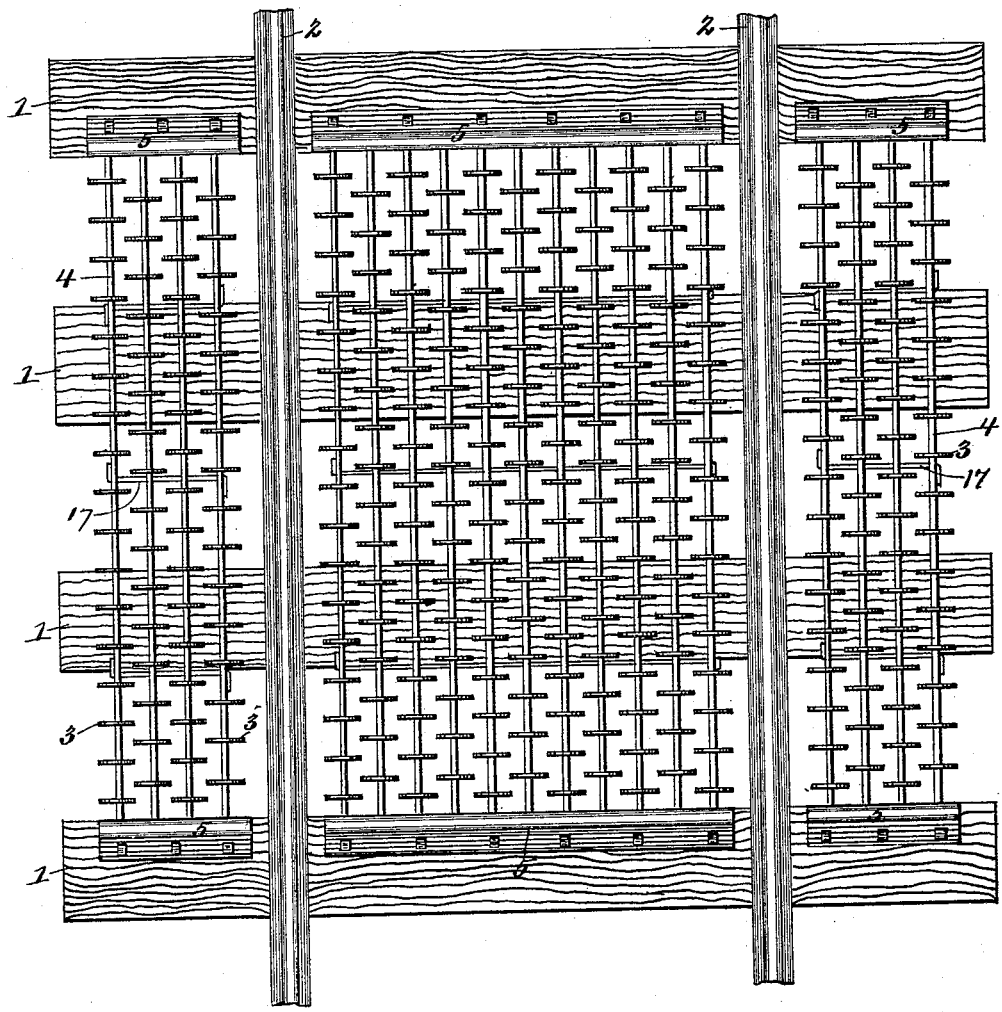
Attest
S. Cotton
E. D. Knight
Inventor
Albert E. Shorthill
By Wright Bros
Atty's

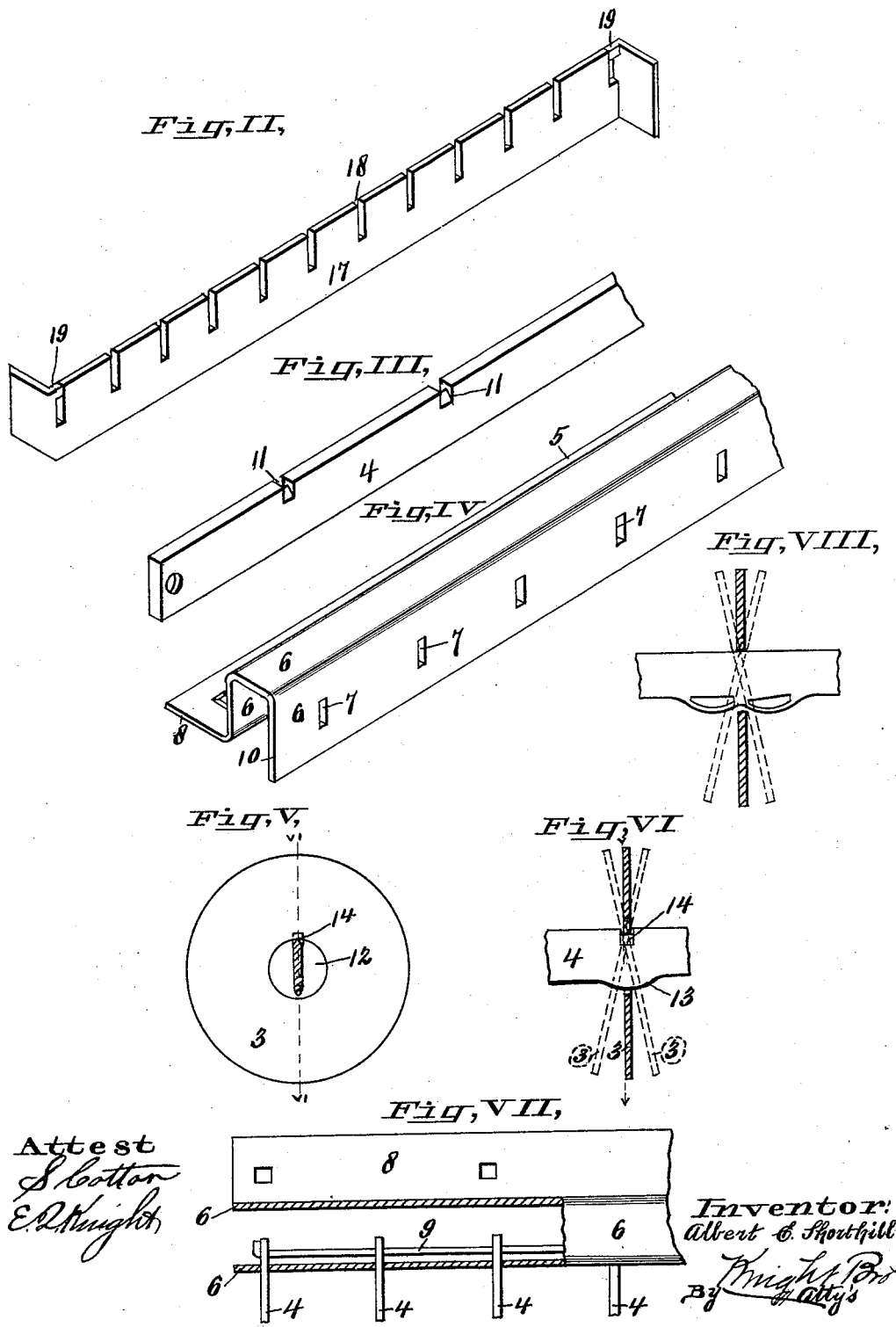

United States Patent Office.

ALBERT E. SHORTHILL, OF MARSHALLTOWN, IOWA.

CATTLE-GUARD FOR RAILWAY-TRACKS.

SPECIFICATION forming part of Letters Patent No. 471,029, dated March 15, 1892.

Application filed September 26, 1891. Serial No. 406,954. (No model.)

*To all whom it may concern:*

Be it known that I, ALBERT E. SHORTHILL, of Marshalltown, in the county of Marshall and State of Iowa, have invented a certain new and useful Improvement in Cattle-Guards for Railway-Tracks, of which the following is a full, clear, and exact description, reference being had to the accompanying drawings, forming part of this specification.

The object of my invention is to produce a cattle or stock guard for railway-tracks which will be more effective than the old form of guard and which will dispense with the necessity of a pit, which is ordinarily provided, and also to provide a guard which can be quickly put in position and removed when it becomes necessary to repair the track; and my invention consists in features of novelty hereinafter fully described, and pointed out in the claims.

Figure I is a top or plan view illustrative of my invention. Fig. II is an enlarged perspective view of one of the transverse stays or plates. Fig. III is an enlarged detail perspective view of one of the bars or strips upon which the disks are mounted. Fig. IV is an enlarged detail perspective view of one of the end pieces of the guard. Fig. V is a transverse section of one of the bars or strips, showing one of the disks in elevation, the section being taken on line V V, Fig. VI. Fig. VI is a section taken on line VI VI, Fig. V. Fig. VII is a detail top view part in section. Fig. VIII represents a modification.

Referring to the drawings, 1 represents the ties, and 2 the rails, of a railway-track. It is customary to place a guard in a track in the space of a fence to prevent cattle or stock from getting through or passing from one side to another of a fence at the track. The most common way of forming a guard is by digging a pit and placing sharp-edged timbers over the pit beneath the rails in a direction transverse to the length of the rails. It is not uncommon for stock to attempt to cross a guard of this kind, and, failing to do so, become caught in the guard, injuring themselves and endangering the lives of travelers on the railroad.

A leading feature of my guard is that it presents an appearance which creates apprehension of danger to stock, so that stock is not liable to attempt to cross, and should it do so the first step or two made will cause the animal to turn back and without liability of its being caught in the guard, as with the old form.

My invention, broadly stated, consists in arranging a number of disks or washers between the rails and on each side of the rails, if desired, which present a number of circular surfaces upon which an animal would have to tread to cross the guard and over which an animal would not take more than a step or two before it would turn back, which, as stated, it can do without becoming caught in the guard, while at the same time the round surfaces of the disks or washers do not injure the hoof or foot of the animal, and to make the guard still more alarming to an animal, so that it will not endeavor to cross over, I prefer to arrange the disks or washers loosely on their supports, so that they will be vibrated by the wind or any stir in the air and form a constantly-moving surface.

3 represents the disks or washers, which are supported the proper distance apart upon bars or strips 4, which may be either flat or of other shape in transverse section. I have shown them flat. As shown in Fig. I, there is a space surrounding each disk, so that an open rolling surface is presented upon which an animal would have to tread in an attempt to cross over the guard. The bars or strips 4 are supported by end pieces 5, secured to the ties, as shown in Fig. I. My preferred form of these end pieces is that shown in Fig. IV, each bar having a U-shaped portion 6, with perforations or slots 7 to receive the bars or plates 4, and an extended nailing-flange 8, by which the end pieces are secured to the guards. The ends of the bars or strips 4, which enter the openings or slots 7, are perforated to receive a wire or rod 9, (see Fig. VII,) by which the bars or strips are held to the end pieces. When the guard is in place, the end pieces have their open sides 10 presented downwardly, and their closed upper sides prevent the possibility of a dragging chain or other object on a car being caught or engaging the ends of the bars, which would result in tearing the guard up, so that these end pieces protect the guard from being removed accidentally by any object which may be dragging from a car, which will in coming in contact with the end pieces slip over them.

My preferred manner of securing the disk- or washers to the bars or strips 4 is by forming notches 11 in the bars, which receive the disks, as shown in Figs. V and VI, the disks having perforations or openings 12 to receive the bars or strips. When the disks are put in place, the lower edges of the bars are swaged down, as shown at 13, Fig. VI, so that the disks are held in the notches. The openings in the disks are sufficiently large so that the disks will fit loosely on the bars or strips, so that the wind or any current of air will agitate them and present a constantly moving or vibrating surface, which will tend to alarm an animal and keep it or tend to keep it from making an effort to cross the guard; and even if there should not be sufficient air stirring to vibrate the disks there would still be some advantage in having the disks loosely mounted on the bars or strips, for the reason that if an animal were to step on the disks it would find that it was trying to walk on a shifting surface as well as upon a rolling surface, or a surface composed of a number of circles or rolling disks, and thus the guard is made as near proof against an animal's crossing it as it is possible to make it. To increase the ease with which the disks may be vibrated by the wind or air currents, I form the bottom of the notches 11 with knife-edges 14, as shown clearly in Figs. V and VI, so that with but a very little stir in the air the disks will be vibrated, as shown by dotted lines in Fig. VI.

As shown in Fig. I, I prefer to arrange the bars or strips 4 in line with the rails 2; but this is not absolutely essential, as the bars might be arranged at right angles to the rails or in a diagonal direction. I also prefer to place the disks so that those on one bar will be opposite the spaces of those on the adjacent bars, as by this arrangement they are less liable to interfere or come in contact with each other, and there is less liability of small animals getting their feet through the guard should they endeavor to cross.

To prevent any possibility of the bars 4 being spread or strained apart, I prefer to use one or more cross-pieces 17. (See Figs. I and II.) These plates have notches 18 to receive the bars 4, and have lugs 19 at the ends, which turn over the two outside bars and hold the plate in position vertically. The ends of the plates are turned at right angles and bear against the two outside bars, as shown.

In Fig. VIII, I have shown a different way of holding the disks on the bars. It consists in omitting the notches 11 and forming a swage in the bar on each side of each disk and which will prevent the disk from moving along the bar. Still other means of attaching the disks to the bars might be employed without affecting the material parts of my invention.

A guard thus made is comparatively inexpensive and has been found by actual practice to possess great merit.

I claim as my invention—

1. A cattle-guard section composed of bars or strips and disks mounted on the bars a suitable distance apart, substantially as shown and described.

2. A cattle-guard section composed of bars or strips and disks loosely mounted on the bars or strips, substantially as shown and described.

3. A cattle-guard section composed of bars or strips and disks mounted on the bars or strips a suitable distance apart, those on one bar being placed opposite the spaces between those on the adjacent bars, substantially as shown and described.

4. A cattle-guard section composed of the bars or strips and disks loosely mounted on the bars or strips with a knife-edge contact between them, substantially as and for the purpose set forth.

5. A cattle-guard section composed of the notched bars having knife-edges and disks placed on the bars and fitting in said notches, said bars being swaged beneath the notches, substantially as and for the purpose set forth.

6. A cattle-guard section composed of the bars or strips, disks mounted on the bars or strips, and end pieces to which the bars are secured, said end pieces being U shape in transverse section and having a nailing-flange, substantially as and for the purpose set forth.

7. A cattle-guard section composed of the bars provided with disks and the notched plates 17, having supporting-lugs 19, substantially as and for the purpose set forth.

ALBERT E. SHORTHILL.

In presence of—
THEO. F. BRADFORD,
ANTHONY P. DALY.